M. FOSTER.
Metallurgic and other Regenerator Furnaces.

No. 155,151. Patented Sept. 22, 1874.

UNITED STATES PATENT OFFICE.

MORRISON FOSTER, OF ALLEGHENY, PENNSYLVANIA.

IMPROVEMENT IN METALLURGIC AND OTHER REGENERATOR FURNACES.

Specification forming part of Letters Patent No. 155,151, dated September 22, 1874; application filed May 12, 1874.

*To all whom it may concern:*

Be it known that I, MORRISON FOSTER, of Allegheny, in the county of Allegheny and State of Pennsylvania, have invented a new and useful Improvement in Regenerator-Furnaces; and I do hereby declare the following to be a full, clear, and exact description thereof, reference being had to the accompanying drawing forming a part of this specification, in which—

Figure 2:
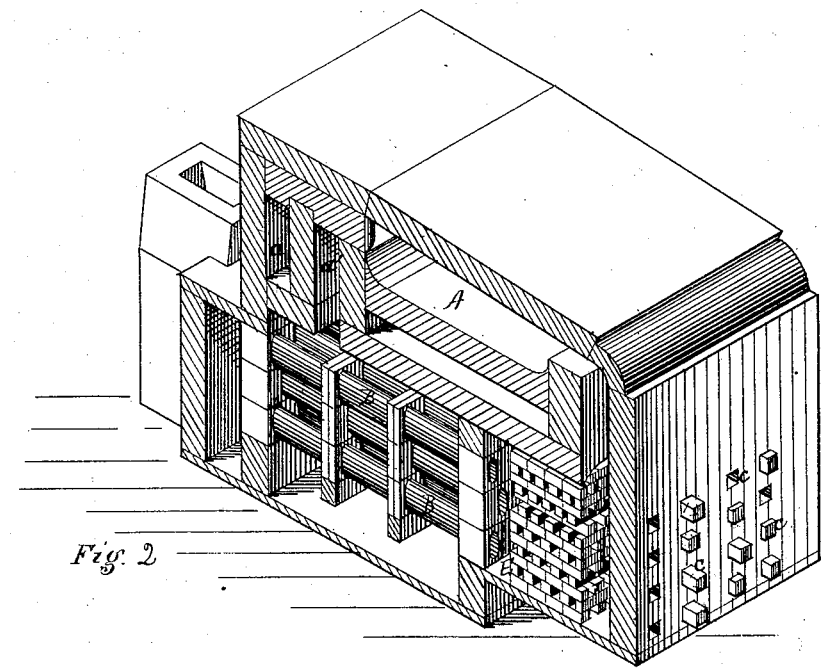
Figure 1:
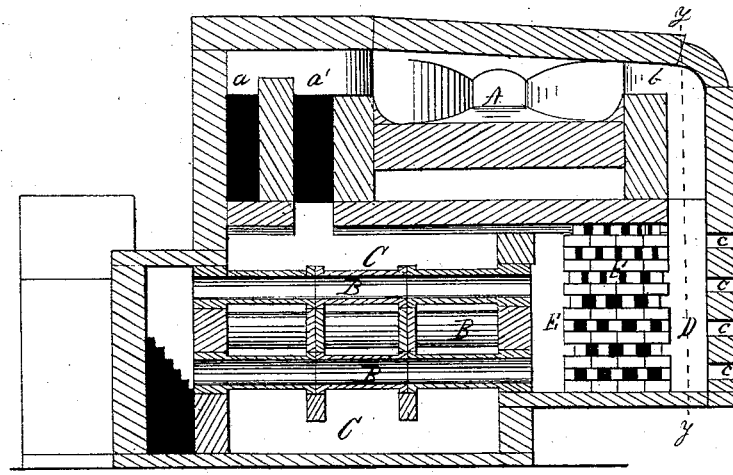
Figure 3:
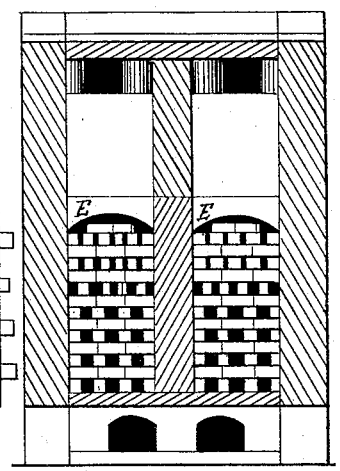

Figure 1 is a vertical longitudinal section, showing the hearth and regenerating-chamber to one side of the meridian line. Fig. 2 is an isometrical perspective view of Fig. 1; and Fig. 3 is a vertical transverse section on dotted line $y\ y$, Fig. 1.

My invention relates to that class of regenerators in which the products of combustion from a furnace or hearth, on their way to the chimney, are utilized, to heat either the incoming air or gaseous fuel used, or both the air and fuel, and is more especially adapted to that class of regenerators wherein tubes or tubular passages permit the products of combustion to escape in one direction to the chimney while the air and gaseous fuel, or either, are passing to the furnace by passages surrounding said tubes, the heat being continuously absorbed by and taken up from opposite surfaces; but it can be used with good effect in regenerators where the heat is imparted to and taken up from the same surface, and the operation of which may be termed intermittent.

Regenerator-furnaces, as a rule, are used in the manufacture of steel, where high temperatures are required, and the products of combustion escape from the hearth at such a high heat as to affect injuriously the tubes or brickworks of which the regenerator is composed. The general form adopted in building furnace of this class is such that the hearth and regenerating-chamber are closely connected, so that no time is permitted for loss of heat by the products of combustion in passing from the hearth to the regenerator, in compactly-built furnaces the regenerating-chamber being just beneath the hearth. As a consequence of this construction great difficulty is encountered in constructing regenerator-furnaces so that the portion of the tubes upon which the products of combustion first strike shall last, the burning out of the tubes, and the breaking due to expansion and contraction being a constant cause of expense and annoyance.

The object of this invention is to so modify the construction of the regenerator that this difficulty shall be overcome and greater durability of, and more uniform distribution of heat through, the regenerators shall be obtained.

To this end my invention consists, first, in placing a checker-work or reticulated barrier in such relation to the mouth of the regenerating-chamber that it shall break the first force of the products of combustion; or, in other words, in interposing a reticulated barrier between the hearth and the regenerator, so as to protect the regenerator from the intense and concentrated heat of the products of combustion escaping from the hearth; secondly, in constructing the checker-work so that the passages for the products of combustion shall gradually increase in number or size from top to bottom or other line of retreat of the flame, so that the waste gases are more uniformly distributed to the regenerator; and, thirdly, in providing a series of air-inlets so placed in relation to the checker-work or barrier that air may be admitted as required to regulate the temperature, and so that the condition of the barrier may be examined from time to time, if desired.

I will now proceed to describe my invention so that others skilled in the art can make and use the same.

In the drawing referred to, A represents the hearth to which the gaseous fuel and air are delivered through the passages $a\ a'$, the products of combustion escaping through the passage or throat $b$. B represents the tubes of the regenerators. In the majority of regenerative furnaces of the continuous class these tubes are composed of either fire-clay or iron, and conduct the waste products from the regenerator to the chimney, the air and gas on their way to the furnace being heated by passing around said tube through the chambers C, which connect with the furnace by means of the passages $a\ a'$. D is a chamber into which the products of combustion are conducted from the hearth. This chamber may be considered, in reality, nothing more than an enlargement of the flue through which the waste products pass to the regenerator. Within this chamber or enlargement of the flue I erect barrier E in the following manner: As illustrated in the drawing, it is built from bricks, which may be fire-clay or any other material, and is of regular form, constructed by piling the bricks in such a manner as to allow of a series of passages increasing in size, in this case, from top to bottom, and it is located directly in front of the tubes B or the mouth of the regenerator. Instead of using bricks of uniform size, and constructing this barrier with a regular checkered appearance, as here presented, the object will be accomplished if any form of brick or block is used which will permit of passages between them, or of the construction of passages increasing either in number or size from top to bottom, or in the direction the flame is moving across the first range of them for the passage of the products of combustion. Against this barrier the intensely-heated waste gases first strike. The object in increasing the diameter of the openings is to cause a more uniform distribution of the gases, a smaller volume passing through where the flame first impinges on the barrier than at the distant points, where the temperature is lower, for the reason that the gases will be more highly heated at the first point than at the latter, and the pressure will also be greater. Directly opposite the barrier E in the face of the outer wall are a series of openings, $c$, more or less in number, as desired. These openings are closed by means of removable plugs, or in any other suitable manner, and are intended to regulate the admission of air to the chamber D, in which the barrier is located, and may also be used for inspecting the condition of the barrier.

The operation of these devices is as follows: The air and gas being mingled and burned upon the hearth A, the intensely-heated products of combustion escape through the throat $b$ into the down-take, impinge at first upon the barrier E. The pressure being greater above and the openings fewer, the greater body of the products will pass to the bottom of the pile before escaping into the regenerator, thus having the first force broken up, and being more evenly distributed to the mouth of the pipes or tubes B, their temperature being much lower than when first escaping from the hearth. When thorough combustion has taken place in the furnace, should it be desired to reduce the temperature of the waste gases in the down-take, the plugs are removed from the openings $c\ c$, and air admitted.

The advantages arising from the use of the barrier are, first, that the regenerator-tubes B are protected from the intense heat of the products of combustion, and do not burn out or become useless so rapidly as heretofore; and, secondly, the barrier becomes a storehouse of heat, which is given off at such times as it may be desirable to stop the furnace, keeping the temperature of the regenerator at such a point that but little time is required to raise the furnace again to a working heat. The necessity for cooling down the regenerator at the same time as the hearth is also dispensed with, and danger of cracking regenerators avoided. Thirdly, instead of having to repair portions of the regenerator, which is, at best, a tedious and expensive operation, the material composing the barrier can be rearranged, or removed and replaced by fresh material, with slight disturbance of the furnace, and at little expense.

It is evident this barrier can be used with hot-blast ovens without further invention.

Having thus described my invention, what I claim, and desire to secure by Letters Patent, is—

1. In combination with a regenerator, a reticulated barrier placed in such relation to the regenerating-chamber that it shall intercept and disseminate the products of combustion on their way to the regenerator, substantially as and for the purpose specified.

2. The barrier E, constructed so that the passages for the products of combustion shall gradually increase in number or size from the point at which the flame impinges or away from line of flame, substantially as and for the purpose specified.

3. In combination with the barrier E, the air-inlets $c$, substantially as and for the purpose described.

In testimony whereof I, the said MORRISON FOSTER, have hereunto set my hand.

MORRISON FOSTER.

Witnesses:
 W. N. PAXTON,
 JAMES I. KAY.